United States Patent [19]

Suvanto

[11] Patent Number: 4,875,515
[45] Date of Patent: Oct. 24, 1989

[54] SLEEVE-MOUNTED SPIKE FITTED ON A VEHICLE TIRE

[75] Inventor: Erkki Suvanto, Porvoo, Finland

[73] Assignee: Neste Oy, Finland

[21] Appl. No.: 267,129

[22] PCT Filed: Feb. 8, 1988

[86] PCT No.: PCT/FI88/00017
§ 371 Date: Oct. 25, 1988
§ 102(e) Date: Oct. 25, 1988

[87] PCT Pub. No.: WO88/06538
PCT Pub. Date: Sep. 7, 1988

[30] Foreign Application Priority Data

Feb. 27, 1987 [FI] Finland ................................. 870881

[51] Int. Cl.$^4$ ............................................. B60C 11/16
[52] U.S. Cl. ..................................................... 152/210
[58] Field of Search ............... 152/167, 169, 208, 210, 152/211, 212, 222

[56] References Cited

U.S. PATENT DOCUMENTS 3,786,849 1/1974 Loqvist ................................. 152/210

FOREIGN PATENT DOCUMENTS 2116965 10/1972 Fed. Rep. of Germany.
140229 6/1975 Norway.
3547 of 1906 United Kingdom ............... 152/210

Primary Examiner—Michael W. Ball
Assistant Examiner—Gregory J. Wilber
Attorney, Agent, or Firm—Steinberg & Raskin

[57] ABSTRACT

The invention concerns a sleeve-mounted spike (10) fitted on a vehicle tire, comprising a rivet (11), a head (12), a tip (13) and a sleeve (14). The part (11a) of the rivet towards the tip and the part (11b) towards the head subtend an angle ($\alpha$) having a magnitude in the range from 150 to 179 degrees, whereby no rectilinear contact is established between the rivet (11) and the sleeve (14), as a result of which when the rivet (11) is urged against the sleeve (14) in vehicle acceleration, braking or sideslipping situations a greater force is required to push the rivet (11) into the tire rubber, however without arresting the movement of the rivet (11) within the sleeve (14).

12 Claims, 2 Drawing Sheets

SLEEVE-MOUNTED SPIKE FITTED ON A VEHICLE TIRE

BACKGROUND OF THE INVENTION

The present invention concerns a sleeve-mounted spike fitted on a vehicle tire, comprising a rivet, a head, a tip and a sleeve.

It is a drawback of sleeve-mounted spikes known in the art that, particularly in those situations when the vehicle is being accelerated or braked or is slipping sidewise, good gripping properties of the spiked tire are required. Good enough griping properties are not achieved in the situations mentioned with sleeve-mounted spikes known at present because the pressure of the rubber material acting on the flange of the spike's rivet is not able to keep the spike sufficiently extruded in a tire slipping situation, whereby the spike will abrade ice. On the other hand, this so-called punching force must not be very high so as to cause no major road attrition effect.

SUMMARY OF THE INVENTION

The object of the invention is to provide an improvement of sleeve-mounted spikes known at present. The more detailed object of the invention is to provide a sleeve-mounted spike which affords substantially better gripping properties in situations when the vehicle is being accelerated or braked or is slipping sidewise.

The aims of the invention are achieved with a sleeve-mounted spike which is mainly characterized in that the part of the rivet towards the tip and the part of the rivet towards the head subtend an angle having a magnitude between 150 and 179 degrees, whereby no rectilinear contact obtains between the rivet and the sleeve, the result being that in situations in which the vehicle is being accelerated or braked or is slipping sidewise the spike is being urged against the sleeve, a higher force is required to push the rivet into the tire rubber, without however arresting the movement of the rivet in the sleeve.

As taught herein, said angle is advantageously in the range from 160 to 178 degrees.

According to the fundamental insight of the invention, the part of the rivet towards the tip increases in diameter towards the tip, or on the part of the rivet towards the tip a discontinuity has been produced in another way, and/or similarly the part of the rivet towards the head increases in diameter towards the head, or on the part of the rivet towards the head a discontinuity has been produced in another way. It has thus been understood in the design of the invention to shape the rivet in such a way that the line of contact between it and the sleeve is not rectilinear and instead forms an obtuse angle having the above-mentioned magnitude. When the rivet is urged against the sleeve in situations in which the vehicle is being accelerated or braked or is slipping sidewise, a greater force is required to push the rivet up because as the rivet is being pushed up it has to move against the forces resulting from the acceleration, braking or side-slipping situations. In this way a higher gripping force is obtained, without arresting the mobility of the rivet within the sleeve.

In an advantageous embodiment of the invention, at least the part of the rivet towards the tip increases in diameter towards the tip.

In an advantageous embodiment of the invention, the sleeve has been shaped so that the hole for the rivet in the sleeve has been disposed to increase in diameter towards the tip.

In an advantageous embodiment of the invention, the clearance between sleeve and rivet is symmetrical, and the clearance between sleeve and rivet is larger in the region of the part of the rivet towards the tip than in the region towards the head.

In one embodiment, said clearance is in the above-mentioned regions equal in size over the entire region.

In another embodiment the clearance is equal in size over its entire length.

In an advantageous embodiment of the invention, the clearance between the sleeve and the rivet is asymmetrical. The clearance may then increase in the direction towards the tip.

Significant advantages are gained with the sleeve-mounted spike of the invention. In a situation when the tire is slipping, as the rivet is urged against the sleeve, the discontinuity on the body of the rivet retains the rivet in extruded position better than the straight flank of the rivet, and the efficiency of the rivet thus improves. In the absence of slipping the rivet is enabled with ease to rise into the sleeve because the discontinuity will not counteract the motion. It has been understood in the design of the invention to extend the part of the rivet towards the tip and, advantageously, also the mouth part of the hole in the sleeve provided for the rivet, whereby no rectilinear contact is established between rivet and sleeve. Thanks to this feature, when the rivet is urged against the sleeve in vehicle acceleration, braking or sidewise slipping conditions, a greater force is required to lift the rivet up, in other words, higher gripping force is obtained, still without arresting the movement of the rivet within the sleeve.

In the sleeve-mounted spike of the invention the magnitude of the angle between the part of the rivet towards the tip and the part of the rivet towards the head is selected to be such that the rivet will not be arrested in vehicle accelerating, braking or sideslip situations. This selection criterion determines the lower limit for said angle. The angle is on the other hand selected so that the force component retaining the rivet in said situations will be great enough. This selection criterion fixes the upper limit for the angle. The size of the angle is dependent on the materials which are used. In practice, the angle cannot be smaller than about 150 degrees, nor on the other hand larger than about 179 degrees.

The selection of angle is influenced not only by the material used but also by the magnitude and configuration of the clearance between the sleeve and the rivet.

BRIEF DESCRIPTION OF THE DRAWINGS

The invention shall now be described in detail, referring to certain advantageous embodiments of the invention, presented in the figures of the attached drawings, yet to which the invention is not meant to be exclusively confined.

DESCRIPTION OF PREFERRED EMBODIMENTS

Figure 1:
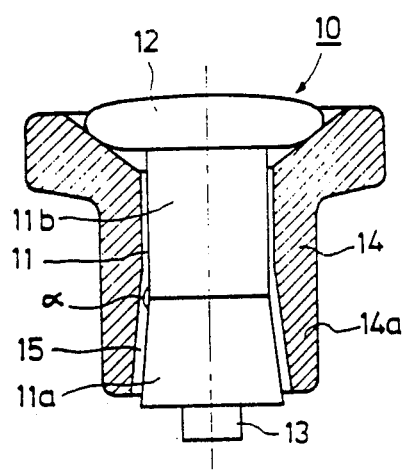
FIG. 1 presents an advantageous embodiment of the sleeve-mounted spike of the invention, in elevational view.

In the embodiment of FIG. 1, the sleeve-mounted spike is indicated with reference numeral 10. The sleeve-mounted spike 10 comprises a rivet 11, a head 12, a tip 13 and a sleeve 14. According to the fundamental idea of the invention, in this embodiment the part 11a of the rivet 11 towards the tip 13 increases in diameter towards the tip 13, and the sleeve 14 has been given such shape that the hole provided in the sleeve 14 for the rivet 11 has been disposed to increase in diameter towards the tip. In FIG. 1 the mouth part of the sleeve 14 has been indicated with reference numeral 14a. As can be seen in FIG. 1, the clearance 15 between the sleeve 14 and the rivet 11 is symmetrical. In this embodiment the clearance 15 between the sleeve 14 and the rivet 11 is wider in the region of the part 11a of the rivet 11 towards the tip 13 than in the region of the rivet 11 towards the head 12. The part 11a of the rivet 11 towards the tip 13 and the part 11b of the rivet 11 towards the head 12 subtend an obtuse angle $\alpha$, which in this embodiment has a magnitude of about 174 degrees.

Figure 2:
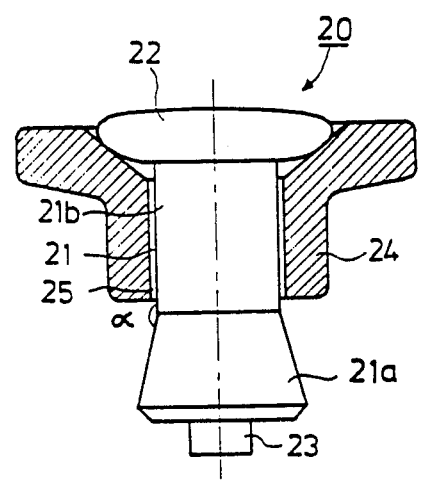
FIG. 2 presents a second advantageous embodiment of the sleeve-mounted spike of the invention, in elevational view.

In the embodiment of FIG. 2, the sleeve-mounted spike in general is denoted with reference numeral 20. The sleeve-mounted spike 20 comprises a rivet 21, a head 22, a tip 23 and a sleeve 24. In this embodiment only the part 21a of the rivet 21 towards the tip 23 increases in diameter towards the tip 23. The clearance 15 between the sleeve 24 and the rivet 21 is symmetrical, and the clearance 25 is equal in size over its entire length. The angle $\alpha$ is about 165 degrees in this embodiment.

Figure 3:
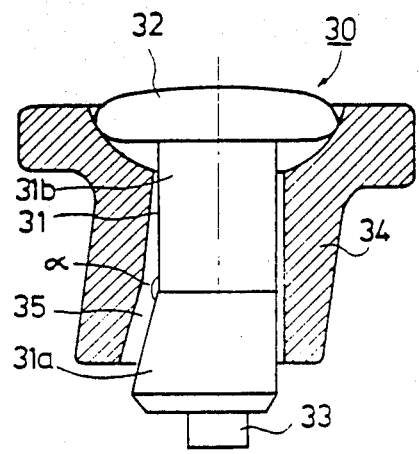
FIG. 3 presents a third advantageous embodiment of the sleeve-mounted spike of the invention, in elevational view.
Figure 4:
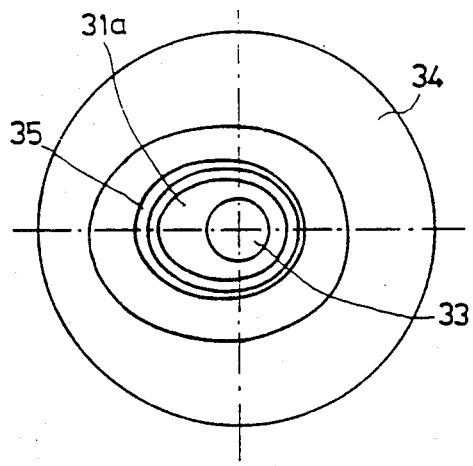
FIG. 4 presents the sleeve-mounted spike of FIG. 3, seen from below.

In the embodiment of FIGS. 3 and 4, the sleeve-mounted spike of the invention in general has been denoted with reference numeral 30. The sleeve-mounted spike 30 comprises a rivet 31, a head 32, a tip 33 and a sleeve 34. In this embodiment, too, the part 31a of the rivet 31 towards the tip 33 increases in diameter towards the tip 33, and furthermore the sleeve 34 has been shaped so that the hole provided for the rivet 31 in the sleeve 34 has been disposed to increase in diameter towards the tip 33. In this embodiment the clearance 35 between the sleeve 34 and the rivet 31 is asymmetrical. The clearance 35 increases in the direction towards the tip 33. The angle $\alpha$ is about 165 degrees in magnitude in this embodiment.

Figure 5:
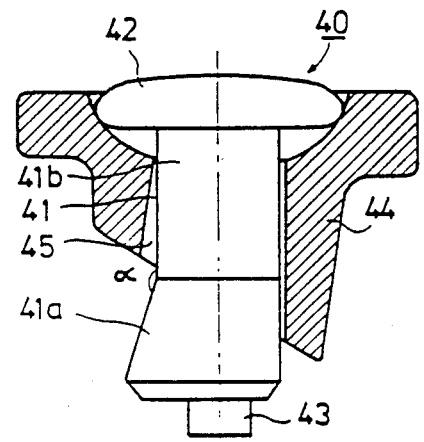
FIG. 5 presents a fourth advantageous embodiment of the sleeve-mounted spike of the invention, in elevational view.

In the embodiment of FIG. 5, the sleeve-mounted spike of the invention is denoted with reference numeral 40. The sleeve-mounted spike 40 comprises a rivet 41, a head 42, a tip 43 and a sleeve 44. The clearance 45 between the sleeve 44 and the rivet 41 is asymmetrical in this embodiment, too, and the clearance 45 increases in diameter towards the tip 43. This embodiment is otherwise identical with that of FIGS. 3 and 4, except that the sleeve 44 has been made asymmetrical in such manner that the sleeve 44 encircles asymmetrically the part 41a of the rivet 41 towards the tip 43 and only the part 41a of the rivet 41 towards the tip on one side. The magnitude of the angle $\alpha$ is likewise 165 degrees in this embodiment.

Figure 6:
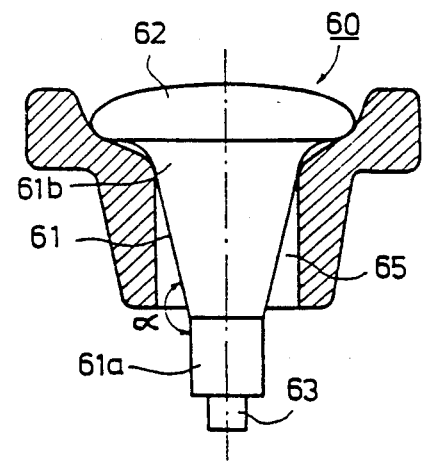
FIG. 6 presents a fifth advantageous embodiment of the sleeve-mounted spike of the invention, in elevational view.

In the embodiment of FIG. 6, the sleeve-mounted spike of the invention in general is denoted with reference numeral 50. The sleeve-mounted spike 50 comprises a rivet 51, a head 52, a tip 53 and a sleeve 54. This embodiment is otherwise identical with that of FIG. 2, except that in the embodiment of FIG. 6 the part 51b of the rivet 51 towards the head 52 increases in diameter towards the head 52. The part 51a of the rivet 51 towards the tip 53 may be uniform in diameter, or it may increase in diameter towards the tip 53. The clearance 55 between the sleeve 54 and the rivet 51 may be symmetrical or asymmetrical. The magnitude of the angle is about 155 degrees in this embodiment.

In the foregoing merely a few advantageous embodiments of the invention have been presented, and it is obvious to a person skilled in the art that numerous modifications thereof are feasible within the inventive idea stated in the claims following below.

I claim:

1. A sleeve-mounted spike (10;20;30;40;50) fitted on a vehicle tire comprising a rivet (11;21;31;41;51), a head, (12;22;32;42;52), a tip (13;23;33;43;53) and a sleeve (14;24;34;44;54), characterized in that the part (11a;21a;31a;41a;51a) of the rivet towards the tip and the part (11b;21b;31b;41b;51b) of the rivet towards the head subtend an angle ($\alpha$) having a magnitude in the range from 150 to 179 degrees, whereby between the rivet (11;21;31;41;51) and the sleeve (14;24;34;44;54) no rectilinear contact is established, with the result that when the rivet (11;21;31;41;51) is urged against the sleeve (14;24;34;44;54) in vehicle acceleration, braking or sideslipping situations a greater force is required to push the rivet (11;21;31;41;51) into the tire, however without arresting the movement of the rivet (11;21;31;41;51) within the sleeve (14;24;34;44;54).

2. Sleeve-mounted spike according to claim 1, characterized in that the magnitude of the angle ($\alpha$) is in the range from 160 to 178 degrees.

3. Sleeve-mounted spike according to claim 1, characterized in that at least the part (11a;21a;31a;41a;) of the rivet (11;21;31;41) towards the tip (13;23;33;43) increases in diameter towards the tip (13;23;33;43).

4. Sleeve-mounted spike according to claim 1, characterized in that at least the part (51b) of the rivet (51) towards the head (52) increases in diameter towards the head (52).

5. Sleeve-mounted spike according to claim 1, characterized in that the sleeve (14;34;44) is so shaped that the hole in the sleeve (14;34;44) for the rivet (11;31;41) is disposed in increase in diameter towards the tip (13;33;43).

6. Sleeve-mounted spike according to claim 4, characterized in that the sleeve (54) is so shaped that the hole in the sleeve (54) for the rivet (51) is of substantially constant diameter toward the tip (53).

7. Sleeve-mounted spike according to claim 1, characterized in that the clearance (15;25;55) between the sleeve (14;24;54) and the rivet (11;21;51) is symmetrical.

8. Sleeve-mounted spike according to claim 1, characterized in that the clearance (15) between the sleeve (14) and the rivet (11) is larger in the region of the part (11a) of the rivet (11) towards the tip (12) than in the region of the part (11b) of the rivet (11) towards the head (12).

9. Sleeve-mounted spike according to claim 8, characterized in that said clearance (15) is in said regions of equal size over the entire region.

10. Sleeve-mounted spike according to claim 1, characterized in that the clearance (25) is substantially constant over its entire length.

11. Sleeve-mounted spike according to claim 1, characterized in that the clearance (35;45) between the sleeve (34;44) and the rivet (31;41) is asymmetrical.

12. Sleeve-mounted spike according to claim 11, characterized in that the clearance (35;45) increases towards the tip (33;43).

* * * * *